United States Patent Office 3,102,303
Patented Sept. 3, 1963

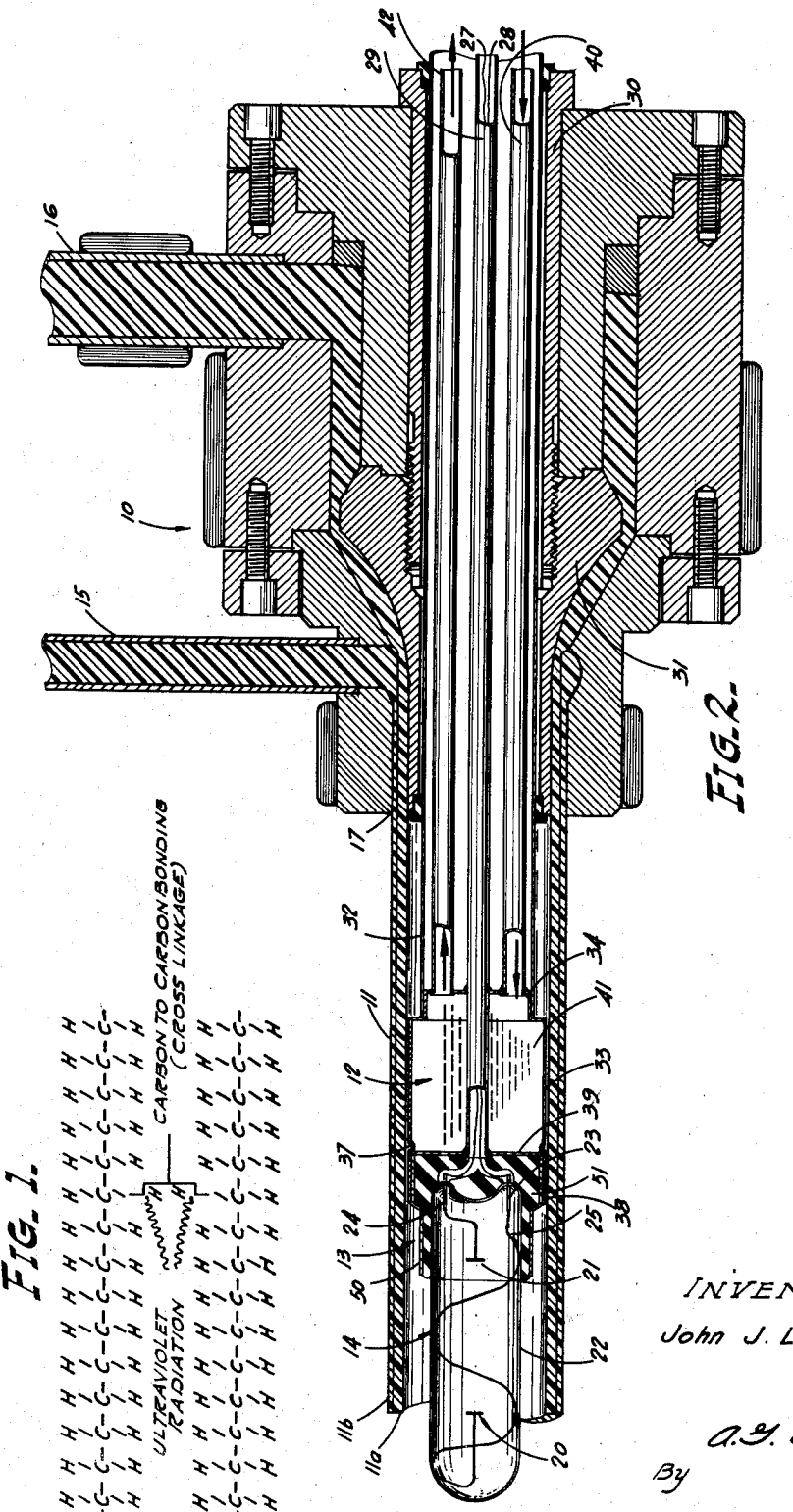

3,102,303
APPARATUS FOR IRRADIATION OF PLASTICS
John J. Lainson, Hastings, Nebr., assignor to Western Plastics Corporation, Hastings, Nebr., a corporation of Nebraska
Filed Dec. 18, 1958, Ser. No. 781,368
2 Claims. (Cl. 18—14)

This invention relates to a new and improved apparatus for fabricating plastic. The novel techniques herein disclosed are particularly adapted for use in association with conventional processes for extruding polyethylene pipe.

A principal object of this invention is to increase the tensile strength of plastic pipe, both at room temperatures and at elevated temperatures of the order of 300° F. This increase in tensile strength also enables the pressure rating of the pipe to be increased.

Another object is to make plastics more resistant to chemicals and the phenomenon of environmental stress cracking.

Another object is to prevent the refabrication of plastics by rendering remelting impossible.

Polyethylene in its clear, virgin form will crosslink when subjected to the shorter wave lengths of ultraviolet light. That is, the energy of the ultraviolet light causes the hydrogen atoms connected to the carbon chain of the polyethylene molecule to be freed from bondage to the carbon atoms; thus, an open bond is formed. The polyethylene molecules, being in a linear or semi-linear arrangement, are thus bound carbon to carbon as is shown in FIG. 1 of the drawings.

The objects of this invention are attained by subjecting plastic to controlled ultraviolet radiation during the extrusion of the plastic to cause crosslinking. In a preferred application of the irradiation procedure, a source of ultraviolet radiation is supported by a water mandrel which extends from a die for extruding plastic pipe. In the usual plastic extruding process, the plastic material is extruded from the die and while in a softened state is passed over a water mandrel so that this material may be cooled. In the process of this invention, the interior of the plastic pipe is irradiated as the pipe proceeds past the water mandrel so that crosslinking may be attained.

In the irradiation of polyethylene with ultraviolet energy, one must distinguish between the useful and harmful wave lengths. Those wave lengths above 3,000 angstroms, including infrared (above 8,100 angstroms), are definitely harmful to polyethylene; however, those wave lengths below 3,000 angstroms possess sufficient energy to cause crosslinking which will create effects as previously stated.

The shorter or ultraviolet wave lengths, which are radiated from natural sources, are filtered by the atmosphere and are thus short-lived. Therefore, a local intense source of ultraviolet energy is required in order to effect useful crosslinking. The longer wave lengths including infrared are transmitted easily and thus promote deterioration of the type which is well-known in the plastic art.

In the process of this invention, the plastic pipe is preferably irradiated as it emerges from the die in a softened state with ultraviolet radiation in the range of 900 to 3,000 angstrom units. With the radiation source positioned immediately adjacent the inner surface of the plastic pipe, a radiation intensity of the order of 40,000 microwatts per square centimeter is required to subject the plastic to sufficient intensity to effect crosslinking.

In order that optimum results may be obtained from the foregoing process, it is preferable that approximately 90% of the radiation be concentrated at approximately 2,537 angstrom units.

In order that all the features for attaining the objects of this invention may be readily understood, reference is herein made to the drawings wherein:

FIG. 1 is a diagram of a polyethylene molecule showing crosslinking in response to ultraviolet radiation, and FIG. 2 is a sectional view of a preferred apparatus for extruding and irradiating plastic material in accordance with the principles of this invention.

Referring now to FIG. 2, the structure shown therein comprises an extrusion die 10 which is employed to extrude plastic pipe 11. A water mandrel 12 is rigidly supported relative to and projects from the extrusion die 10. The left terminal end of this mandrel supports a socket 13 for receiving ultraviolet generator tube 14.

In the operation of the particular extrusion apparatus shown, plastic material is supplied to inlet pipes 15 and 16 of extrusion die 10. The material is united and extruded from the outlet 17 of the die 10, and a pipe 11 is formed which travels from right to left in the drawing.

During the initial moments after which the plastic material is extruded from outlet 17, it is in a moldable and softened state, and thereafter it is passed over the water mandrel 12 so that the material may be cooled to form a rigid pipe. After cooling and before final setting, the travelling pipe sections proceed past ultraviolet tube 14 and are internally subjected to energy radiated from tube 14.

It should be understood, that the process of this invention is not applicable to the extrusion of plastic materials which are processed with carbon black or other agents which render the plastic opaque. Accordingly, the extrusion die 10 must be supplied with material in its virgin state or otherwise sufficiently capable of absorbing an adequate quantity of ultraviolet energy to produce crosslinking.

The particular die shown in the drawings is the subject matter of U.S. Patent No. 2,859,476 issued November 11, 1958, to John J. Lainson. Reference should be made to this patent for construction details. This die is designed for the simultaneous extrusion of a multiple layer pipe characterized by an inner layer of virgin and translucent plastic material and an outer layer which is rendered opaque by the inclusion of carbon black.

In the drawing, numeral 11a denotes an inner layer of virgin material, and numeral 11b denotes an outer layer of opaque material. In view of the fact, that the inner layer 11a is capable of transmitting and absorbing ultraviolet energy, the apparatus herein disclosed is capable of attaining the stated objects with respect to this type of plastic pipe. It should be understood, however, that the extrusion die 10 need not be capable of extruding multiple layers, and that the steps and techniques of this invention are ideally suited for use in conjunction with dies which extrude plastic pipe formed from a single layer which is not opaque.

Ultraviolet tube 14 is generally of a conventional design; however, certain modifications are required so that this tube can be fabricated to attain a size compatible for use within plastic pipe 11 and also for mounting by socket 13. This tube is of the cold cathode type filled with argon and mercury to a pressure of 15 mm. of mercury. The tube contains two electrodes 20 and 21 which are spaced relative one another on the longitudinal axis of the tube envelope 22 so that the positive column formed therebetween is not masked to an appreciable extent by socket 13 or other tube supporting structure. External connection is made to electrode 20 at terminal 23, and external connection is made to electrode 21 at terminal 24. Conductor 25 interconnects electrode 20 and terminal 23. This conductor is positioned within the tube and is spiraled around the inside wall of the tube.

Conductors 27 and 28 are connected to terminals 23 and 24 so that tube 14 may be energized by an external source located at a remote distance from die 10. Conductors 27 and 28 are housed within metallic conduit 29 so as to provide a protective covering for these conductors. Conduit 29 is positioned within the central bore of die 10 which is defined by screw plug 30 and a forming mandrel 31. The central bore of die 10 also contains a thin metallic tube 32 which projects past die outlet 17 in such a manner as to support cold water mandrel 12 at a distance removed from the die outlet 17. Cold water mandrel 12 includes two cylindrical sections 33 and 34. Cylindrical section 34 is formed on a reduced diameter, as compared to that of section 33, so section 34 may be received within the left terminal end of tube 32. Tube 32 and cold water mandrel 12 are rigidly fixed to one another so that no relative movement is permitted therebetween.

Section 33 of cold water mandrel 12 is formed with an annular rib 37 and a projecting ring portion 38. Wall 39 is located adjacent rib 37 so as to define an end wall for cold water mandrel 12. Additionally, wall 39 provides a terminal seat for socket 13.

During the extrusion process, cold water is transmitted to the chamber 41 of cold water mandrel 12 through water inlet pipe 40. Chamber 41 is thus filled with cold water which is free flowing inasmuch as outlet pipe 42 enables the cold water within chamber 41 to be withdrawn. Continuous water flow through pipe 40, chamber 41 and pipe 42 enables plastic pipe 11 to be continuously cooled during the extrusion process.

Socket shell 50 is rigidly fixed to ring 37 which projects past end wall 39 of cold water mandrel 12. A seat of insulating material 51 is housed within shell 50. This seat 50 is formed with a bore or recess so that the right terminal end of tube 14 may be inserted therein for support in the operating position shown in the drawing. In view of the fact that tube 14 is energized by the secondary output of a high reactance transformer having a voltage of the order of 500 volts A.C. at 20 milliamperes, conductors 27 and 28 and also tube 14 must be adequately insulated from the adjacent metallic structures so that no shorting to ground can occur.

When pipe 11 is extruded at rates conventional in the plastic art and is irradiated as hereinbefore set forth, the tensile strength of the pipe increases in the order of 25%. This increase in tensile strength also promotes an increase in the pressure rating of the pipe. The irradiated plastic becomes more resistant to chemicals and environmental stress cracking. The crosslinking of the molecular structure of the plastic also prevents plastic remelting and therefore irradiated plastic cannot be refabricated.

It should be understood that the above described techniques and apparatus are merely illustrative of the principles of this invention, and that numerous modifications may be made without departing from the scope of the invention.

What is claimed is:

1. In apparatus for fabricating plastic pipe including a pipe extrusion die having a forming mandrel, and a cooling mandrel axially aligned with the forming mandrel and projecting from the die, the improvement comprising a source of ultraviolet radiation supported by the mandrel immediately adjacent thereto with the die extruded pipe first enveloping the cooling mandrel and then the ultraviolet radiation source while in a softened plastic condition and during the extrusion process.

2. In apparatus for fabricating plastic pipe including an extrusion die having a pipe forming mandrel and a water cooling mandrel axially aligned with the forming mandrel, the improvement comprising said water mandrel having an outer tubular shell formed with an annular rib dividing said shell into a first cylindrical section adjacent the die and a ring portion projecting away from the die, a socket including a tubular socket shell including an end wall forming a bottom for said socket inserted within the projecting ring portion of said water mandrel with said end wall contacting the annular rib to form a cooling water compartment within said first cylindrical section isolated by said end wall from said socket, a seat of electrically insulating material disposed within said socket shell and formed with a discharge tube receiving recess, an ultraviolet radiation discharge tube including a pair of discharge electrodes having one tube end inserted within said socket seat recess and a second tube end projecting away from said socket with said electrodes being spaced along a longitudinal axis aligned with the longitudinal axis of said forming mandrel and the water cooling mandrel, a spiral conductor disposed within the discharge tube making electrical connection with tube electrode farthest removed from said socket, a metallic tube disposed within a central core in said die and supporting the water mandrel, discharge tube and its socket, water inlet and outlet pipes disposed within said metallic tube and communicating with said water compartment, and a conduit disposed with said metallic tube and passing through said water compartment and into said socket and containing electrical conductors for energizing said discharge tube, whereby as the die extruded plastic pipe envelopes the water mandrel and the discharge tube it is thereby internally irradiated during extrusion.

References Cited in the file of this patent

UNITED STATES PATENTS

| | | |
|---|---|---|
| 1,133,610 | Bleeker | Mar. 30, 1915 |
| 2,423,520 | Richards | July 8, 1947 |
| 2,448,828 | Renfren | Sept. 7, 1948 |
| 2,461,630 | Cozzo | Feb. 15, 1949 |
| 2,484,529 | Roedel | Oct. 11, 1949 |
| 2,583,330 | Eckert | Jan. 22, 1952 |
| 2,616,126 | Merck et al. | Nov. 4, 1952 |
| 2,640,023 | Cier | May 26, 1953 |
| 2,683,896 | Patterson | July 20, 1954 |
| 2,834,983 | Norton | May 20, 1958 |
| 2,859,476 | Lainson | Nov. 11, 1958 |
| 2,919,473 | Cole | Jan. 5, 1960 |
| 3,014,799 | Oster | Dec. 26, 1961 |

FOREIGN PATENTS

| | | |
|---|---|---|
| 723,631 | Great Britain | Feb. 9, 1955 |

OTHER REFERENCES

Modern Plastics, vol. 34, pp. 129–136, July 1957.